United States Patent [19]

Harris

[11] Patent Number: 5,323,009
[45] Date of Patent: Jun. 21, 1994

[54] CONFORCAL MICROSCOPE

[76] Inventor: Martin R. Harris, 9 Stud Road, Dandenong, Victoria 3175, Australia

[21] Appl. No.: 971,912
[22] PCT Filed: Apr. 5, 1991
[86] PCT No.: PCT/AU91/00129
 § 371 Date: Dec. 2, 1992
 § 102(e) Date: Dec. 2, 1992
[87] PCT Pub. No.: WO91/15792
 PCT Pub. Date: Oct. 17, 1991

[30] Foreign Application Priority Data

Apr. 6, 1990 [AU] Australia .................. PJ9538
Aug. 3, 1990 [AU] Australia .................. PK1571
Nov. 8, 1990 [AU] Australia .................. PK3233

[51] Int. Cl.$^5$ .................. G02B 21/00; G02B 21/06
[52] U.S. Cl. .................. 250/458.1; 250/358.1; 250/227.20; 359/385; 359/389
[58] Field of Search .................. 250/338.1, 341, 358.1, 250/458.1, 459.1, 227.20, 227.23, 227.26, 227.28; 356/317, 318, 417; 359/385, 389, 227, 234, 235

[56] References Cited

U.S. PATENT DOCUMENTS

| 4,410,235 | 10/1983 | Klement et al. |
| 4,500,204 | 2/1985 | Ogura .................. 250/458.1 X |
| 4,927,254 | 5/1990 | Kino et al. .................. 359/235 |
| 5,101,295 | 3/1992 | Lichtman et al. .................. 359/227 X |
| 5,120,953 | 6/1992 | Harris .................. 250/227.2 |

FOREIGN PATENT DOCUMENTS

| 0283256 | 9/1988 | European Pat. Off. . |
| 450305 | 10/1991 | European Pat. Off. .......... 250/458.1 |
| 2628543 | 12/1977 | Fed. Rep. of Germany . |
| WO8903057 | 4/1989 | World Int. Prop. O. . |
| WO9000754 | 1/1990 | World Int. Prop. O. . |
| 9001716 | 2/1990 | World Int. Prop. O. .......... 359/385 |

Primary Examiner—Constantine Hannaher
Assistant Examiner—Edward J. Glick
Attorney, Agent, or Firm—Price, Heneveld, Cooper, DeWitt & Litton

[57] ABSTRACT

A confocal epi-illumination microscope includes a light laser, for supplying a light beam to a light condenser such as condenser focuses the light onto the object to be examined so as to illuminate a observational field on or within the object. Reflected, fluorescent or scattered light illuminated point field is collected by the condenser and transmitted to a returning may be a camera. The outgoing light passing from the light source to the returning light are transmitted through optical fibres in the light the returning light to a receiver. The outgoing illuminating light is subject to scan the object and the returning light is subject to similar or tandem movements to scan the photographic film. In one embodiment, the scanning movements and returning light are provided by two sets of scanning mirrors. arrangements, tandem scanning may be achieved by a pin hole or slit in a light intermediate focal point.

15 Claims, 4 Drawing Sheets

CONFORCAL MICROSCOPE

TECHNICAL FIELD

This invention relates to the field of microscopy and more particularly to scanning confocal microscopes.

The principles of a scanning confocal microscope are disclosed in U.S. Pat. No. 3,013,467 of Marvin Minsky. The basic principle is that illumination of the specimen or object to be observed is confined to a restricted region and observation or detection is confined to that illuminated region. A complete image is derived by scanning the specimen or object under observation region by region through a complete field of view of the microscope.

Confocal microscopes have better resolution than conventional microscopes and sharper definition in that out of focus signals and interference are much reduced. They have found particular application in the examination of biological specimens by epi-fluorescence where the reduction of out of focus interference is a major advantage.

International Patent Application No. PCT/AU89/00298 discloses the use of fibre optics in confocal microscopes of various configurations. The present invention applies fibre optics to tandem scanning microscopes in which the returning confocal light is scanned across a photographic film, a two dimensional CCD chip or some other photosensitive means in tandem with the scanning of the illuminating light across the specimen to produce a real time image. Microscopes of this kind are known in which the isolation of the focal plane in the specimen under observation is achieved in a conventional lens system by the movement of a series of pin holes or one or more slits in a very thin sheet of opaque material, the plane of the sheet of opaque material coinciding with an intermediate focal plane of the microscope system. Such systems have been described by Petran, Kino and others as described for example in The Handbook Of Biological Confocal Microscopy, James Pawley editor, IMR Press, 1989.

By the present invention, light is carried to and from the object to be examined by means of one or more optic fibres which serve as transmitters for the illuminating light and the returning confocal light. In some arrangements in accordance with the invention, the optic fibres provide effective pin holes enabling isolation of the focal plane in the specimen under observation. In other embodiments of the invention, the spatial filter producing the focal plane isolation is not the core of the fibre itself but is located at an intermediate focal plane produced by a further lens. In these cases the spatial filter may consist of a thin sheet of opaque material coinciding with the intermediate focal plane.

DISCLOSURE OF THE INVENTION

According to the invention there is provided a scanning confocal epi-illumination microscope comprising:
a light source;
optical fibre means to receive and transmit illuminating light from the light source;
a light condenser for receiving the illuminating light transmitted via the optical fibre means and for condensing the illuminating light onto an object to illuminate an observational field on or within the object and for receiving light emanating from the observational field and directing that emanated light back along the optical fibre means as light returning in a direction opposite to the illuminating light;
light separator means for separating the returning light from the illuminating light;
returning light receiver means for receiving returning light from the light separator means and for exposing a photosensitive means to the returning light; and
scanning means operative to move the illuminating light in a scanning path relative to said object and simultaneously to move the returning light in a corresponding scanning path relative to the photosensitive means whereby to cause the photosensitive means to produce from the returning light an image of the scanned object.

The scanning means may comprise a first scanner to move the illuminating light as it is transmitted from the optical fibre means to the object, a second scanner to move the returning light as it is transmitted from the light separator means to the light receiving means, and scanner control means to co-ordinate the scanning movements of the first and second scanners.

In alternative arrangements, the light separator means comprises a beam splitter disposed between the light source and the optical fibre means, the optical fibre means comprises a bundle of optic fibres extending longitudinally side by side from a first bundle end which receives light from the light source to a second fibre bundle end from which the illuminating light is transmitted to the condenser and onto which object emanated light is condensed by the condenser, and the scanning means comprises a light screen provided with aperture means disposed between the beam splitter and the bundle of optic fibres at an immediate image focus plane so that the illuminating light and returning light both pass through the aperture means and a scan generator to move the screen and aperture means transverse to the illuminating and returning light.

In order that the invention may be more fully explained, some specific embodiments will be described in some detail with reference to the accompanying drawings.

BRIEF DESCRIPTION OF THE DRAWINGS

FIG. 1 illustrates a scanning confocal microscope system constructed in accordance with the invention. This microscope comprises a high intensity light source in the form of a laser generator 1 to supply a light beam 2 which is focused by a lens 3 into one end of a flexible optical fibre 4. The other end of optical fibre 4 runs into one side of a directional coupler 5 which may be of fused biconical taper coupler or other coupler for separating light rays travelling in opposite directions. The light going into one of the outgoing limbs 6 at the other side of the coupler is absorbed with minimal Fresnel reflection by an indexing matching media body 7 while light going into the other leg of the coupler at that side is transmitted by a flexible optical fibre 8 to fibre end 9 from which it is transmitted to the optical train of an optical microscope denoted generally as 10.

Figure 1:
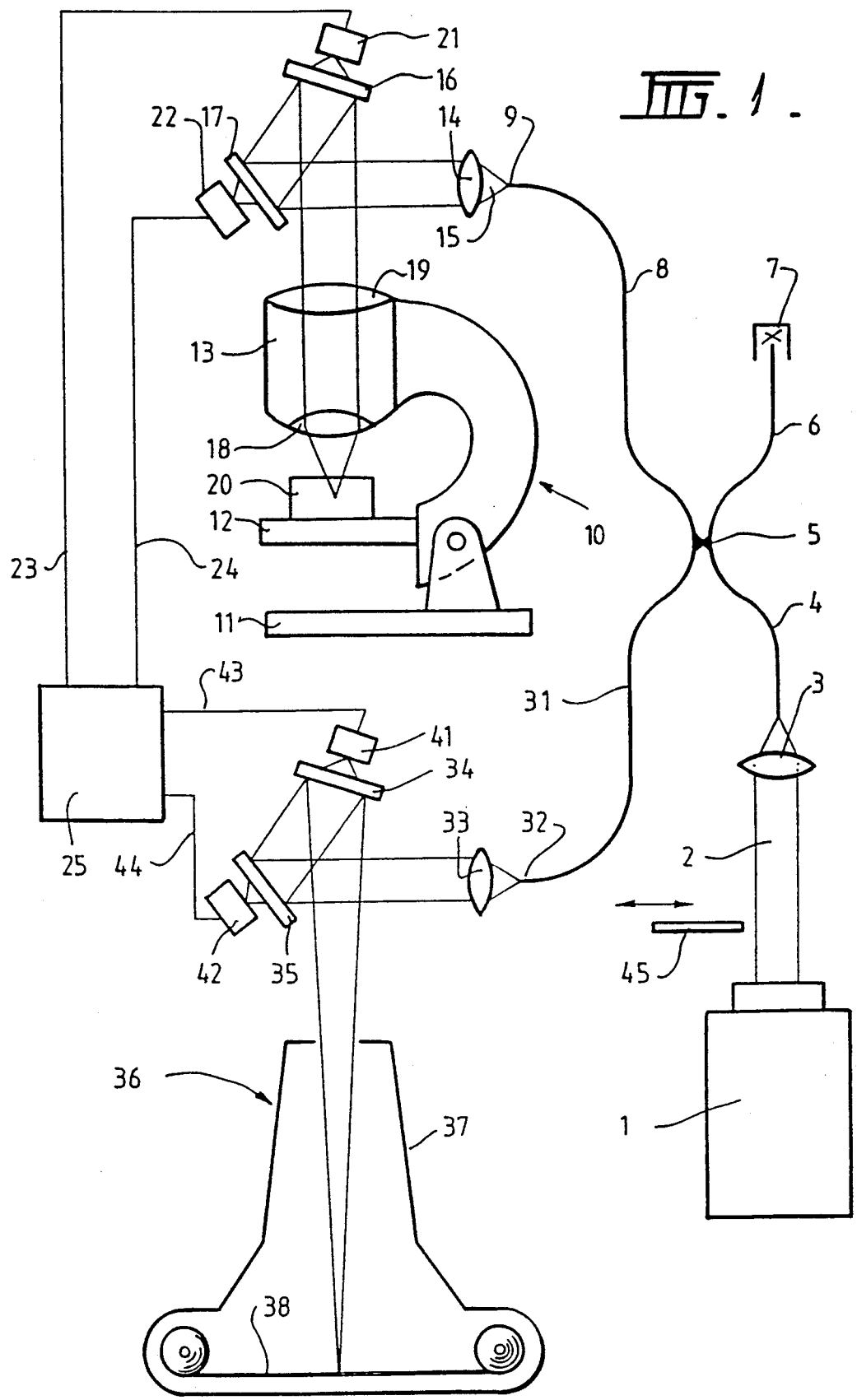
FIG. 1 illustrates a tandem scanning confocal microscope constructed in accordance with the invention.

Optical microscope 10 comprises a base 11 on which there is mounted a mechanically adjustable specimen support platform 12 and a microscope body 13 housing the components defining the optical train of the microscope. These optical components comprise a lens 14 to receive the light 15 diverging from the end 9 of fibre 8, a pair of mirrors 16, 17 by which the light transmitted through lens 14 is successively reflected via a beam converging lens 19 to a light condenser in the form of a lens 18 which condenses or focuses the light onto a spot or point observational field in a specimen 20 supported on the platform 12.

Mirrors 16, 17 can be moved by transducers 21, 22 in response to signals supplied through electrical connections 23, 24 from an electronic scanning signal generator 25 such that the reflected light beam is moved in X and Y directions to cause the illuminated spot to traverse the specimen in a scanning pattern. Scanning means of this kind is used in conventional scanning confocal microscopes.

As well as focusing high intensity light onto the specimen to produce an illuminated spot, the condenser lens 18 also receives light emanating from the specimen which is transmitted back through the optical train of the microscope 10 to the optical fibre 8. Depending on the nature of the specimen, this light emanating from the specimen may comprise reflected light, Raman scattered light or fluorescent light. It is to be understood that the term "emanating" as this specification is to be construed in a broad sense as covering any light transmitted back from the object through the condenser.

The returning light reconverges to a focus back at the tip 9 of optical fibre 8 and travels back up that fibre to the coupler 5 where a portion of that light is transmitted via the fourth leg of the coupler and a further flexible optical fibre 31 to a fibre tip 32.

The separated returning light is collected from tip 32 by a lens 33 and directed by a pair of scanning mirrors 34, 35 to a returning light receiving means 36 in the form of a camera comprising a camera body 37 fitted with conventional means to hold a roll of photographic film 38.

Scanning mirrors 34, 35 are moved by transducers 41, 42 in response to signals supplied through electrical connections 43, 44 from the electronic scanning signal generator 25 so that the mirrors 41, 42 are moved in exact synchronism with the mirrors 16, 17. Thus, the separated returning light is focused as a spot on the film 38 which is moved in a scanning pattern co-ordinated with the scanning pattern of the illuminating light on the specimen so as to develop an image on the photographic film. The two sets of scanning mirrors are synchronised as exactly as possible so that the projected spot on the film rasters exactly the same sequence in the microscope stage. A beam chopper 45 may be provided to intermittently block the laser beam 2 in synchronism with the scanning mirror but approximately 90° out of phase to eliminate fly back light and the possibility of double images caused by slight phase differences between the fast scan movements of the two sets of mirrors 16, 34, 35.

Figure 2:
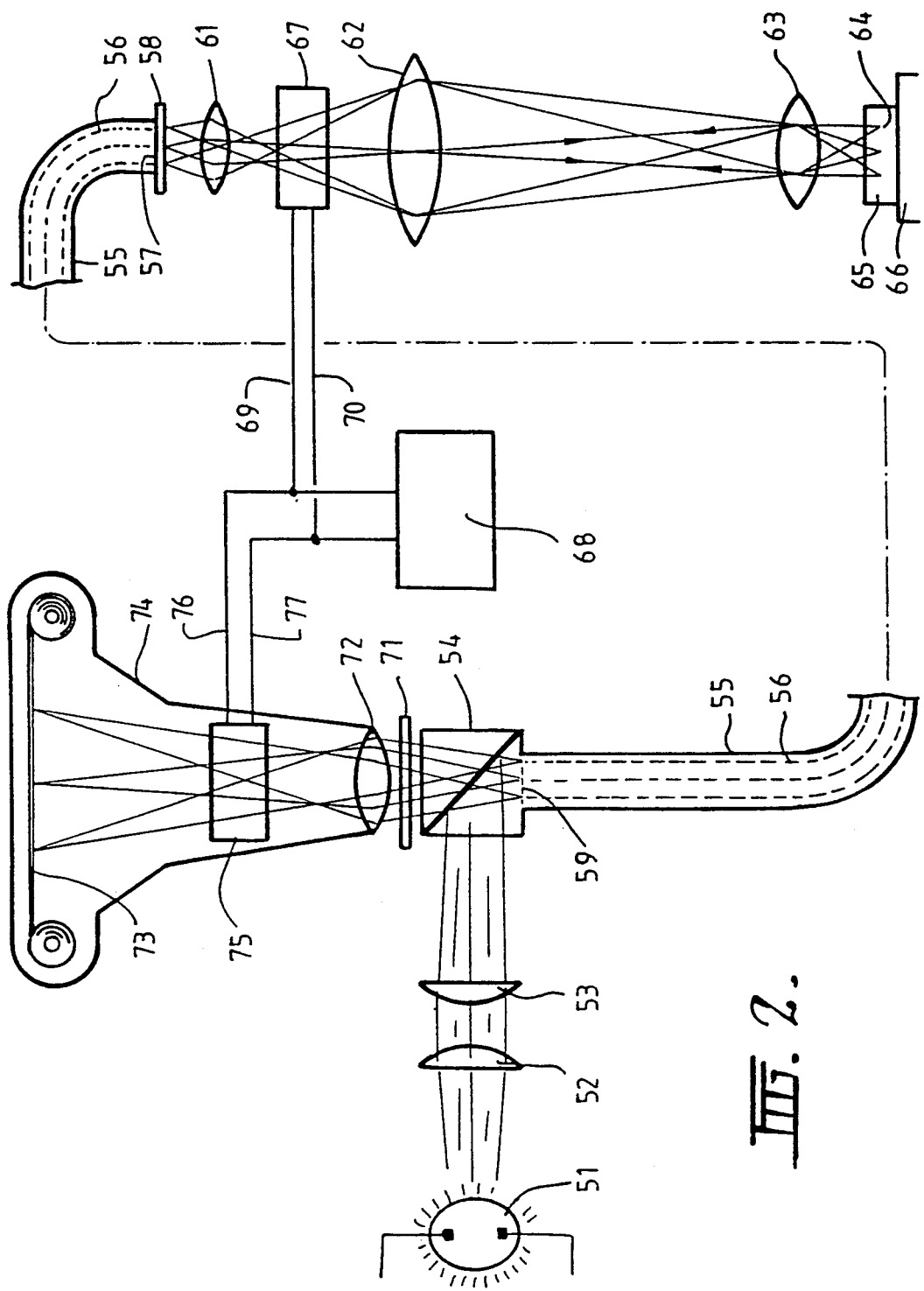
FIG. 2 illustrates an alternative form of scanning confocal microscope constructed in accordance with the invention which enables use of a relatively cheap incoherent light source.

FIG. 2 illustrates an alternative microscope system capable of employing a relatively cheap incoherent light source such as a mercury vapour globe. Light from the illumination source 51 is condensed by lenses 52, 53 and reflected by a beam splitter cube 54 onto the end of an optical fibre bundle 55. Bundle 55 comprises a large number of single mode fibres 56 extending longitudinally side by side from the bundle end 59 to a remote bundle end 57 fitted with an anti reflection glass sheet 58.

The cores of fibres 56 carry illuminating light coherently and the illuminating light emerges through glass sheet 58 as cones of light emerging one from each of the fibre cores. These cones of light are focused by lenses 61, 62, 63 into diffraction limited spots 64 (or more accurately Gaussian waists) within a specimen 65 on a microscope stage 66. Between lenses 61 and 62, the illuminating light passes through a scanner 67 which causes the illuminated spots 64 to be scanned in a raster pattern. Scanner 67 which may comprise a pair of reflecting mirrors and transducers arranged in similar fashion to the scanning mirrors and transducers of the microscope illustrated in FIG. 1 receives scanning control signals from a scanning signal generator 68 via electrical connections 69, 70.

Fluorescence generated from within each of the illuminated spots or Gaussian waist areas 64 travels back through lenses 63, 62, 61 and confocally to the same core in the fibre bundle from which the illuminating light initially came. This returning light then travels back along the fibre cores and emerges into the beam splitter cube 54 (which may be of the dichroic mirror type) and passes through a filter 71 which removes any laser light but passes the Stokes shifted fluorescence which is then focused by a lens 72 onto a photosensitive film 73 within a camera head 74.

Camera head 74 carries a scanner 75 which is generally similar to the scanner 67 and receives scanning movement signals from the signal generator 68 via connections 76, 77. Scanner 75 causes the returning light being onto film 73 to be scanned synchronously with the spots within the specimen and the scanning movements are identically oriented with respect to the two sets of fibre cores at each end of the fibre bundle.

Optically and mechanically the microscope illustrated in FIG. 2 is very similar to that illustrated in FIG. 1 except that a plurality of optical fibres is used thus permitting the employment of cheaper incoherent light sources. Preferably, the cladding size of the fibres is chosen to give the best ratio between the core area and cladding area to provide an optimal isolation of the focal plane for a particular set of specimen types.

Figure 3:
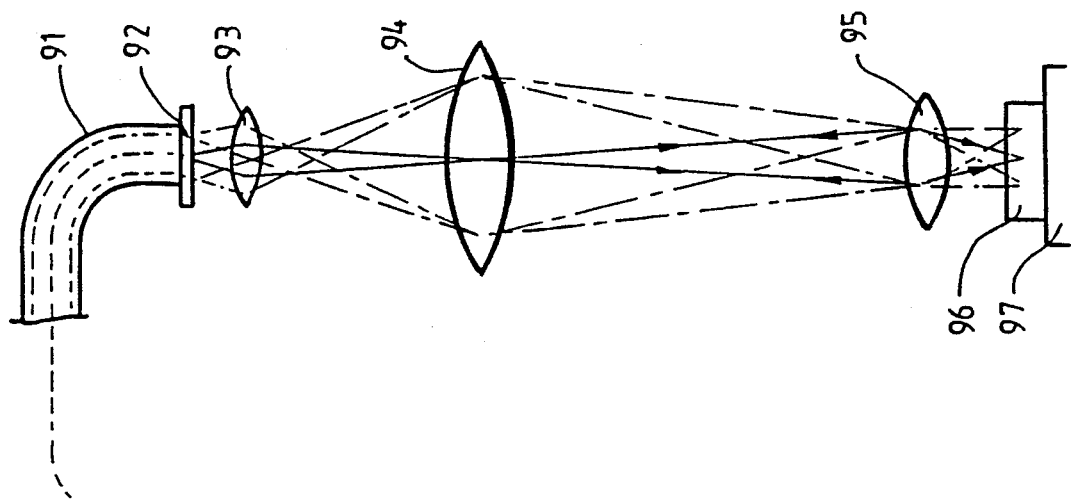
FIG. 3 illustrates a further alternative form of microscope also constructed in accordance with the in which scanning is achieved by movement of a single light screen provided with a slit or a series of pin holes.
Figure 3:
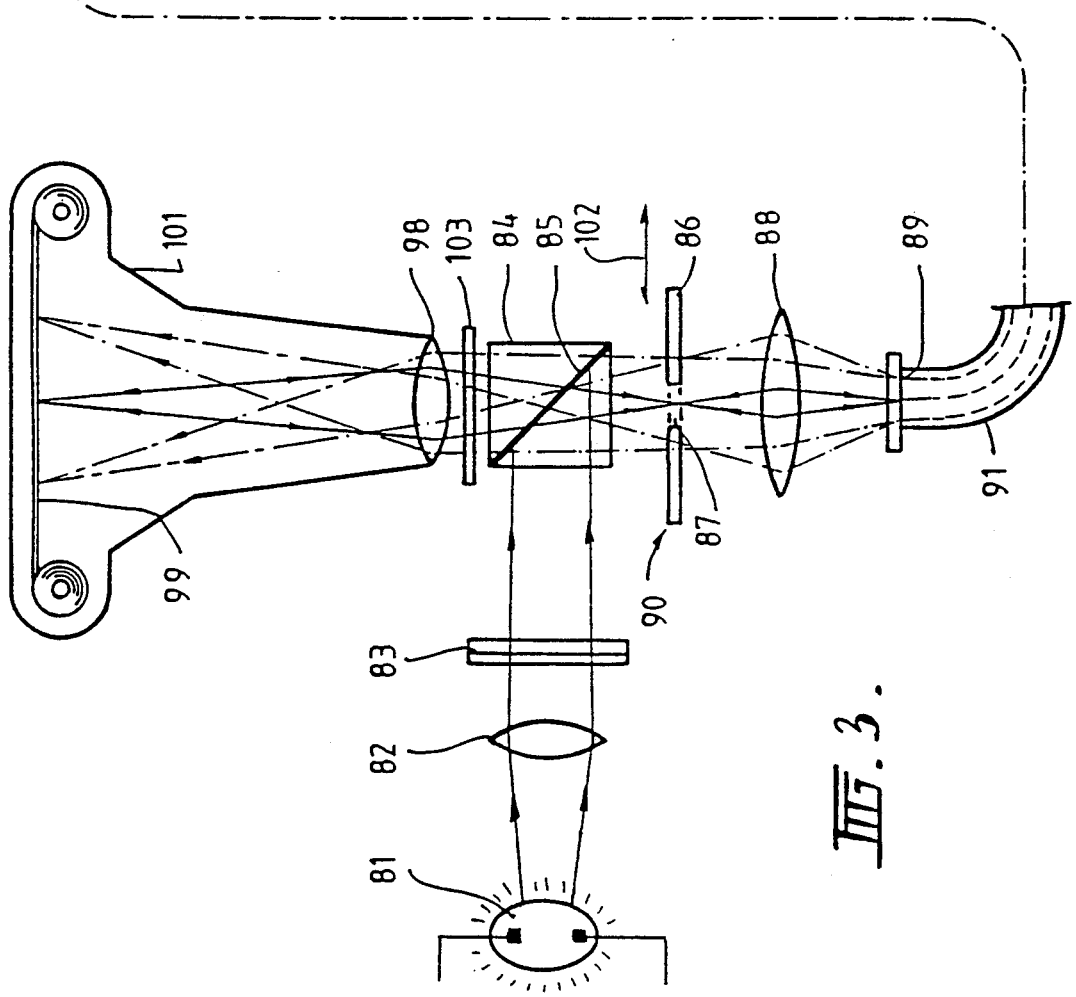

FIG. 3 illustrates a microscope system which employs a conventional coherent fibre bundle as used in normal endoscopes. The fibres will accordingly have a much lower cladding area than the fibres in the bundle used in the embodiment of FIG. 2. This allows non-laser light sources to be used and normal endoscopes to be converted to confocal microscopes. The scanning is carried out by means of movement of one or more pin holes or slits in a thin opaque membrane located in an intermediate focal plane allowing confocal focal plane isolation to be achieved.

The microscope system illustrated in FIG. 3 comprises a light source 81 which may be a short arc mercury vapour lamp. Light from light source 81 passes through a lens 82 and a filter 83 which isolates a desired spectral line to a beam splitter 84 comprising a dichroic mirror 85. The light from source 81 is reflected by mirror 85 to a light screen 86 which has aperture means 87. The aperture means may be in the form of one or more slits or one or more individual pin holes. Light passing through the aperture means 87 is focused by a further lens 88 onto the end 89 of a coherent fibre imaging bundle 91 which may be of the same kind as used in conventional endoscopy. Lens 88 projects an image of the slit(s) or pin hole(s) 87 in screen 86 onto the end 89 of fibre bundle 91 and this light is conveyed to the other end 92 of the bundle where it emerges to be refocussed by microscope lenses 93, 94, 95 to one or more lines or on or within a specimen 96 located on a microscope stage 97. Fluorescence or reflection from the focal plane of the objective lens 95 goes back through lenses 95, 94 and 93 to re-enter the same fibres from which the illuminating light emerged. Light from out-of-focus areas is returned into the fibre bundle substantially via other fibres within the bundle.

On emerging from the end 89 of fibre bundle 91, the returning light is refocussed at the intermediate focal plane 90 at which the light screen 86 is located. The confocally returned light passes back through the aperture means 87 but the screen 86 blocks returning light from the out-of-focus parts of the specimen. The light returned through aperture means 87 passes through beam splitter 84 and is focused by a lens 98 onto a film 99 held in a camera head 101.

In the embodiment illustrated in FIG. 3, scanning of both the specimen and the film in the camera is achieved by scanning movement of light screen 86 as indicated by arrows 102. Specifically, screen 86 is reciprocated in directions transverse to the illuminating and returning light paths. Scanning motion of the screen 86 carrying the aperture means 87 in the intermediate focal plane 90 allows the whole of the specimen focal plane to be visualised. A long pass optical filter 103 may be interposed in the light path if fluorescence is to be imaged.

Figure 4:
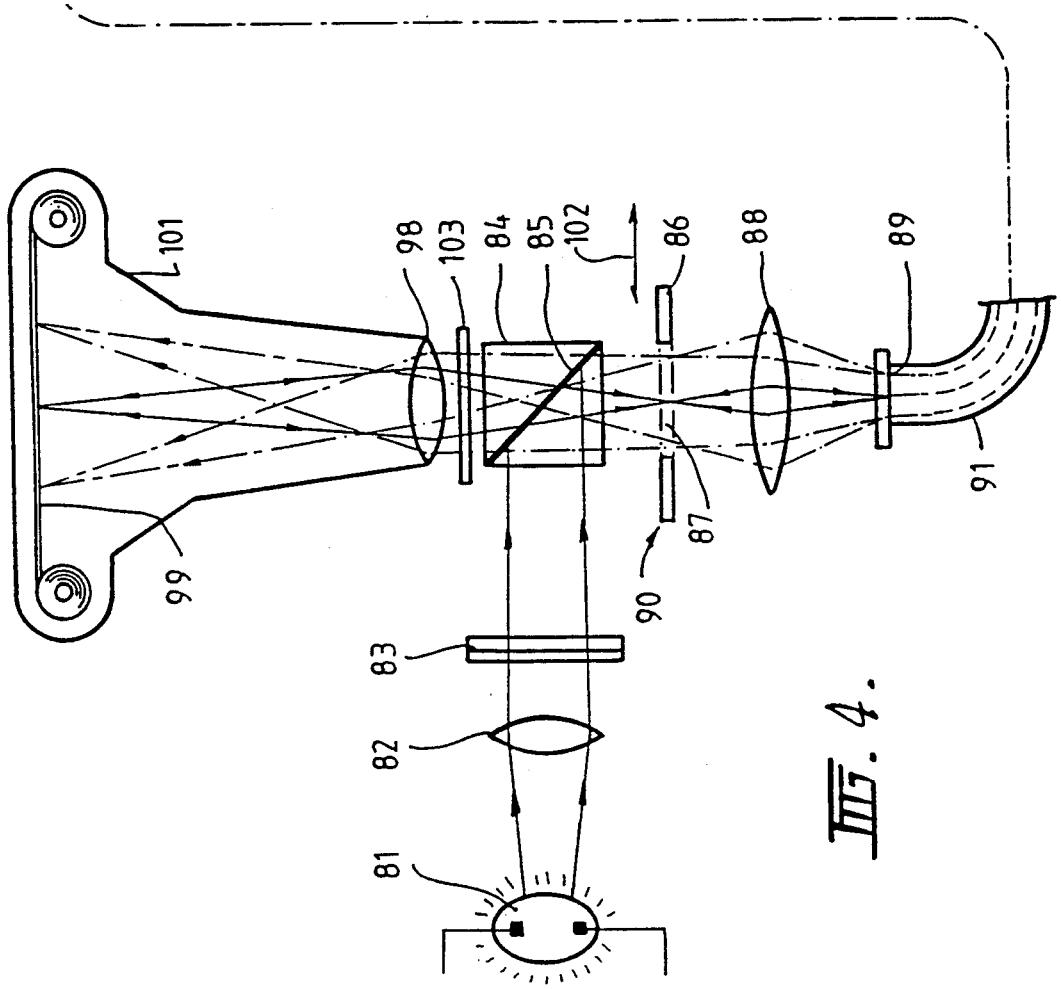
FIG. 4 illustrates a microscope similar to that illustrated in FIG. 3 but designed specifically for operation as an endoscope.

FIG. 4 illustrates a microscope system which is essentially the same as that illustrated in FIG. 3 and which like parts have been identified by like reference numerals. In this case, the microscope is modified by fitting the outer end of optical fibre bundle 91 with an endoscope head 110 fitted with a single objective lens 111 in place of the multiple lens imaging system of the microscope illustrated in FIG. 3. This enables miniaturisation of the head and endoscopic operation. The microscope otherwise operates in identical fashion to that illustrated in FIG. 3.

I claim:

1. A scanning confocal epi-illumination microscope comprising:
    a light source;
    optical fibre means to receive and transmit illuminating light from the light source;
    a light condenser for receiving the illuminating light transmitted via the optical fibre means and for condensing the illuminating light onto an object to illuminate an observational field on or within the object and for receiving light emanating from the observational field and directing that emanated light back along the optical fibre means as light returning in a direction opposite to the illuminating light;
    light separator means for separating the returning light from the illuminating light;
    returning light receiver means for receiving returning light from the light separator means and for exposing a photosensitive means to the returning light; and
    scanning means operative to move the illuminating light in a scanning path relative to said object and simultaneously to move the returning light in a corresponding scanning path relative to the photosensitive means whereby to cause the photosensitive means to produce from the returning light an image of the scanned object.

2. A microscope as claimed in claim 1, wherein the scanning means comprises a first scanner to move the illuminating light as it is transmitted from the optical fibre means to the object, a second scanner to move the returning light as it is transmitted from the light separator means to the light receiving means, and scanner control means to co-ordinate the scanning movements of the first and second scanners.

3. A microscope as claimed in claim 2, wherein the optical fibre means comprises a first optical fibre for transmitting the illuminating light from the light source to the light separator means and a second optical fibre for transmitting returning light from the light separator returning light receiving means.

4. A microscope as claimed in claim 3, wherein the light separator means comprises an optical fibre coupler coupling said first and second fibres to a third optical fibre providing an optical path for transmission of the illuminating light from the light source to the condenser and transmission of the returning light from the condenser to the coupler.

5. A microscope as claimed in claim 4, wherein the first scanning means operates to move the illuminating light being transmitted from the third optical fibre to the condenser and the second scanning means operates to move the returning light transmitted from the second optical fibre to the light receiving means.

6. A microscope as claimed in claim 5, wherein the first and second scanning means comprise movable light reflectors.

7. A microscope as claimed in claim 1, wherein the light separator means comprises a beam splitter disposed between the light source and the optical fibre means.

8. A microscope as claimed in claim 7, wherein the optical fibre means comprises a bundle of optical fibres extending longitudinally side by side from a first bundle end which receives illuminating light from the light source to a second fibre bundle end from which the illuminating light is transmitted to the condenser and onto which object emanated light is condensed by the condenser.

9. A microscope as claimed in claim 8, wherein the optical fibres are single mode fibres.

10. A microscope as claimed in claim 1, wherein the light separator means comprises a beam splitter disposed between the light source and the optical fibre means, the optical fibre means comprises a bundle of optical fibres extending longitudinally side by side from a first bundle end which receives light from the light source to a second fibre bundle end from which the illuminating light is transmitted to the condenser and onto which object emanated light is by the condenser, and the scanning means comprises a light screen provided with aperture means disposed between the beam splitter and the bundle of optical fibres at an intermediate image focus plane so that the illuminating light and returning light both pass through the aperture means and a scan generator to impart scanning movement to the screen containing the aperture means.

11. A microscope as claimed in claim 10, wherein said scanning movement is transverse to the illuminating and return light.

12. A microscope as claimed in claim 10, wherein is disposed at an intermediate focal plane at which both the illuminating returning light are focused.

13. A microscope as claimed in claim 10 wherein the aperture means comprises a plurality of individual apertures to produce a plurality of illuminating light beams spaced transversely across the fibre bundle and a complementary plurality of object emanated returning light beams, and the scan generator is operative to move the screen with reciprocatory motion.

14. A microscope as claimed in claim 10, wherein the light condenser comprises lens means carried within an endoscope head fitted to the second fibre bundle end of the bundle of optical fibres.

15. A microscope as claimed in claim 1, wherein the returning light receiving means comprises a camera receiver adapted to hold a photographic film to serve as the photosensitive means to produce said image as a photographic image.

* * * * *

UNITED STATES PATENT AND TRADEMARK OFFICE
CERTIFICATE OF CORRECTION

PATENT NO. : 5,323,009
DATED : June 21, 1994
INVENTOR(S) : Martin R. Harris

It is certified that error appears in the above-indentified patent and that said Letters Patent is hereby corrected as shown below:

Abstract, line 1
after "light" insert --source, which may be a --.

Abstract, line 3
after "such" insert --a lens. The--.

Abstract, line 4
after "a" insert --point--;

Abstract, line 6
after "light" insert --from the--;

Abstract, line 7
after "returning" insert -- light receiver, which

Abstract, lines 8 and 9
after "to the" insert --condenser and the--;

Abstract, line 9 and 10
after "in the light" insert --separator to divert--;

Abstract, line 11
after "subject to" insert --scanning movements to--;

Abstract, line 12
after "tandem" insert --scanning--;

Abstract, line 14
after "movements" insert --of the illuminating--;

UNITED STATES PATENT AND TRADEMARK OFFICE
CERTIFICATE OF CORRECTION

PATENT NO. : 5,323,009
DATED : June 21, 1994
INVENTOR(S) : Martin R. Harris

It is certified that error appears in the above-indentified patent and that said Letters Patent is hereby corrected as shown below:

Abstract, line 15
    after "mirrors." insert --In other--;

Abstract, line 17
    after "light" insert --screen located at an--;

Column 2, line 51
    after "with the" insert --invention--;

Column 2, line 63
    after "be of" insert --a--;

Column 3, line 33
    after "as" insert --used in--;

Column 3, line 65
    after "16," insert --17 and--;

Column 4, line 8
    after "through" insert --anti-reflection--;

Column 4, line 37
    after "being" insert --focused--;

Column 5, line 8
    after "lines or" insert --spots--;

Column 6, line 18
    after "separator" insert --means to the--;

UNITED STATES PATENT AND TRADEMARK OFFICE
CERTIFICATE OF CORRECTION

PATENT NO. : 5,323,009
DATED : June 21, 1994
INVENTOR(S) : Martin R. Harris

It is certified that error appears in the above-indentified patent and that said Letters Patent is hereby corrected as shown below:

Column 6, line 58
after "light is" insert --condensed--;

Column 7, line 1
after "wherein" insert --the aperture means--;

Column 7, line 3
after "illuminating" insert --light and the--;

Signed and Sealed this

Twenty-eight Day of February, 1995

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,323,009
DATED : June 21, 1994
INVENTOR(S) : Martin R. Harris

It is certified that error appears in the above-indentified patent and that said Letters Patent is hereby corrected as shown below:

> On the title page: Item [54] and Column 1, line 1
> "CONFORCAL" should be --CONFOCAL--;

Signed and Sealed this

Sixth Day of June, 1995

Attest:

BRUCE LEHMAN

*Attesting Officer*  *Commissioner of Patents and Trademarks*